United States Patent Office 3,826,744
Patented July 30, 1974

3,826,744
LUBRICANT FOR HIGH TEMPERATURE,
NON-CHIP METAL FORMING
Rudiger Holinski and Oswald Schanzer, Munich, Germany, assignors to Dow Corning Corporation, Midland, Mich.
No Drawing. Filed June 30, 1971, Ser. No. 158,586
Claims priority, application Germany, Sept. 22, 1970,
P 20 46 727.0; Feb. 24, 1971, P 21 08 738.7
Int. Cl. C10m 3/18, 3/04, 7/20
U.S. Cl. 252—23      2 Claims

ABSTRACT OF THE DISCLOSURE

A lubricant for high temperature non-chip metal forming consisting essentially of (I) 2 to 100% by weight of a mixture of (A) 35 to 47% by weight of an alkali metal sulfate, calculated in its anhydrous form, (B) 14 to 26% by weight borax, (C) 3.5 to 10% by weight of potassium chloride, (D) 3.5 to 10% by weight of sodium acetate trihydrate, (E) 10 to 32% by weight of pulverized graphite having a particle size not exceeding 10 m$\mu$. and (II) 0 to 98% by weight of water.

SPECIFICATION

Non-chip metal forming at high temperatures is becoming more important to the industry every day. Because of complexities involved in high temperature lubrication, efforts in controlling the very high frictional forces have been prolonged and usually consisted of partial success, i.e. sacrificing one important property to obtain another.

Industry has long been interested in solving the complex problems associated with high temperature metal forming and until now was unable to do so to the extent presented herein.

Many materials and combination of materials have been proposed to overcome this problem.

Reference to DAS 1,279,875, DAS 1,276,268, DAS 1,204,767, DAS 1,050,486, U.S. 2,518,585, U.S. 3,423,317 and U.S. 2,258,309 should be made.

In addition, glasses, particularly silicate and phosphate glasses, have been proposed for use as high temperature lubricants for the hot drawing of metals and for extrusion. For one thing, they have certain disadvantages, in that these preparations are not suitable for other high temperature metal forming processes, e.g. drop forging, and in addition, their removal from the formed workpiece is often very difficult, hydrofluoric acid being for example, necessary for the purpose.

The same drawbacks exist in the case of high temperature lubricants consisting of rock minerals such as, for example, basalts.

Borax based high temperature lubricants, which contain soaps or aliphatic polyalcohol compounds for increasing their wettability, have also been proposed. At the operating temperatures concerned, such lubricants are only available in the form of alkali metal borates. At the high temperatures prevailing in metal forming processes, the viscosity of alkali metal borates is too low. Metal-to-metal contact of the interacting parts in the metal forming process, therefore, results with all its adverse consequences.

The same applies to the minerals of the danburite and datolite type which have also been proposed for use as high temperature lubricants.

Lubricants based on aqueous emulsions of a mineral oil containing metal salts of phosphoric acid, boric acid or hydrogen sulphide, particularly zinc, calcium and lead salts, have also been proposed. At the high temperatures, the mineral oil decomposes. The adverse effect of the products of decomposition reduce the life of the tools. Moreover, at the instant of deformation, only a solid material is present which has a separating effect but whose lubricating property is inadequate.

Polymetalacrylates which provide a mixture of metal oxides and residues containing carbon at the temperature of the forming process, have also been proposed for use as high temperature lubricants. As would be expected, the lubricating effect is inadequate, since only a separating effect is exerted. Moreover, the products of decomposition of the polyacrylate residue have an adverse effect on the properties of the tool materials and on the quality of the work piece.

Preparations containing molybdenum disulfide, sodium silicate, sodium phosphate and borax are also known. These materials are applied to the work piece which is to be formed via an aqueous solution and then baked. Understandably such a cumbersome process cannot satisfy the requirements of modern hot forming processes. Such preparations, moreover, lack the driving effect necessary for drop forging.

Preparations containing molybdenum disulfide in the form of a suspension in water or oil have the disadvantage that, at the temperatures prevailing in the forming process, the molybdenum disulfide is converted into molybdenum trioxide which gives a separating effect, but no adequate lubricating or driving effect. Moreover, the small amount of sulphur dioxide, which is present in relatively high local concentrations, may have an adverse effect on the tool and the workpiece and is objectionable from the point of view of the health of the operating personnel.

In drop forging, it is known to introduce sawdust. This provides an appreciable driving effect, but understandably provides no lubrication whatever and may, therefore, rather be regarded as increasing the wear and hence decreasing the working life of the tools.

Most widely used is a mixture of graphite and oil. The use of such products entails such inconvenience and health hazards for operators, that they must be regarded as incompatible with present day concepts of occupational hygiene. Moreover, the properties of the materials of the tool and the workpiece are especially adversely affected by the products of decomposition of mineral oils in particular. Alkali carbonates, particularly sodium carbonate, have also been proposed. Apart from the fact that the hydrodynamic lubrication is inadequate, sodium hydroxide is formed which constitutes a hazard for the operator.

Eutectic salt mixtures, particularly based on alkali phosphates and having a borate and/or alkali chloride and/or alkali sulphate content are also known. These have also been found suitable in the manufactuure of seamless tubes by the Pilgrim process. However, modern forming processes are carried out at such high temperatures that the viscosity of these melts decreases to such an extent that an adequate lubricating effect is no longer provided because of inadequate bearing strength of the lubricating film.

Even the addition of iron oxide, aluminum oxide or other oxides to Kurrol salt (high molecular weight potassium polyphosphate $(KPO_3)_x$) produces only a gradual improvement, since the lubricating effect is not adequately increased and the frequently essential driving effect is lacking, although a certain separating effect is obtained from the non-lubricating solids.

Solid lubricants have also been proposed and in addition have been used as additives to glasses and eutectic salt mixtures, particularly molybdenum disulfide, graphite and silica. At the temperatures prevailing in modern high temperature metal forming processes, molybdenum disulfide decomposes with the consequent disadvantage mentioned above. Insofar as it has not been destroyed, it plates the metallic surface and can only be removed with difficulty, e.g. by pickling. Graphite is burned so that it then obviously ceases to be able to lubricate or, in the case of austenitic steels, results in undesirable carbonization. Silica is not effective as a lubricant, but only exhibits a certain inadequate separating effect.

High temperature lubricants consisting of solid lubricants having substances which exhibit a driving effect, are also known. It has not been appreciated that a liquid melt is necessary for general application to the hot forming of metals.

It can be readily seen where all of the materials mentioned above have some shortcoming or disadvantage which has not been adequately overcome by technique or reformulation.

The object of the present invention is to provide generally applicable high temperature lubricants for non-chip metal forming.

It has been found that such high temperature lubricants must have a combination of properties:

(a) The preparation has to melt within a predetermined temperature range and the molten preparation must have particular viscosity characteristics depending on temperature.

(b) After the forming operation, the residues must be readily removable by water. Fulfillment of the requirements regarding particular viscosities at particular temperatures ensures an adequate bearing strength of the hydrodynamically effective molten film.

(c) Additionally a solid lubricant is necessary to cope with local overloading and a consequent breakdown in the hydrodynamic lubricating film, this solid lubricant also has to provide a driving effect at the temperatures prevailing in the forming process.

(d) Having regard to the operational requirements for the avoidance of health hazards, the avoidance of fire danger and the avoidance of adverse effects on the tool and the workpiece, the high temperature lubricant must be usable not only as such but also in the form of an aqueous preparation. In the latter case, it must contain a stabilizer and/or dispersing agent in order to achieve uniform distribution and to avoid deposition of the solids.

For certain applications, in which it is desired that the melting range should start at a lower value and a certain driving effect is required when melting commences, the lubricant must contain further additives. In the case of some hot metal forming processes such an additional increased driving effect is necessary even at comparatively low temperatures. Since in such cases the temperatures of different tools vary from 150° to 450° C., a lubricating preparation is additionally required in which substances in gaseous and vapor form are liberated in two stages, viz in the first stage at approximately 220° C. and in the second stage at approximately 350° C.

Hence, a preparation which solves the problem posed, must exhibit a lubricating effect, a separating effect, a driving effect and must be capable of being prepared with water, must in certain circumstances enable a reduction of the point at which it softens by means of the addition of a further substance, must in certain circumstances exhibit an additional increased driving effect at comparatively low temperatures and must, at the same time, in the form of the basic preparation be such that its other properties are not adversely affected by the additives which may in certain circumstances be included, and the additives must be such that they do not adversely affect the basic preparation. The variety of the requirements which have to be fulfilled shows that the problem to be solved is an extraordinarily complex one.

Surprisingly, it has been found that this problem can be solved by the selection of particular substances in particular proportions.

The high temperature lubricant for non-chip metal forming an accordance with the invention contains:

35 to 47% by weight of an alkali metal sulphate, calculated in its anhydrous form, preferably sodium sulphate,
14 to 26% by weight of borax,
3.5 to 10% by weight of potassium chloride,
3.5 to 10% by weight of sodium acetatetrihydrate,
10 to 32% by weight of pulverized graphite having a particle size not exceeding 10 $\mu$m.

For applications in which a reduction in the commencement of the molten region appears desirable, the preparation in accordance with the invention preferably additionally contains 5 to 10% by weight of ammonium sulphate, as a percentage of the overall quantity of the preparation.

If a two-stage driving effect is to be accomplished, beginning in the first stage at approximately 220° C. and in the second stage at approximately 350° C., the liberation of substances in gaseous and/or vapor form, the lubricant additionally must contain a mixture consisting, in equal parts by weight, of (a) magnesium hydroxide, (b) organic substances containing nitrogen and belonging to the class of the derivatives of thiatriazol, e.g. Porophor ACM® (manufactured by Farbenfabriken Bayer A.G., Leverkusen, Germany), and/or azodicarbonamide and/or azoisobutyric acid dinitrile in a proportion of 10 to 30% by weight of the overall quantity of the preparation.

In the case where a preparation in accordance with the invention is to be used in a carrier of water, which is normally the case, the water is present to the extent of up to 98% by weight based on the weight of the solution of the high temperature lubricant and the high temperature lubricant in accordance with the invention preferably additionally contains 1 to 3% by weight of a dispersing agent of the class of the sulfonated aliphatic polyesters (such as Humifen WS 25®) or of the sulfonated alcohols (such as Humifen MNF®) or of the sodium alkyl naphthalin sulfonates, particularly sodium ethyl naphthalin sulfonate (such as Humifen BA 75®), manufacturer of the Humifen® products is GAFC, New York, N.Y. Preferably, there is additionally included 1 to 4 weight percent of a stabilizer of the class of the polysaccharides, e.g. one of the products known by the trade name Kelzan® (manufactured by Kelco Company, Los Angeles and Chicago, U.S.A.), or an alkyl cellulose, particularly methylcellulose of the series of products known by the trade name Natrosol® (manufactured by Hercules, Inc., Wilmington, Delaware, U.S.A.), or of the class of alginates, e.g. one of the products known by the trade name Algipon® (manufactured by Henkel and Cie., Dusseldorf, Germany).

Some preparations in accordance with the invention will now be described and compared with prior art preparations, with reference to specific applications. These examples make apparent not only a precise teaching for the respective high temperature non-chip metal forming processes, but also the surprising technical advance achieved by the preparations according to the invention. The examples disclose to the man skilled in the art the procedure for high temperature metal forming processes not described in the examples, since he is able to apply the teaching according to the invention by simple analogous considerations. The manufacture of the preparations according to the invention are not described in detail, since they are simple mixing processes well known to the man skilled in the art.

Example 1

A mixture of 40 parts by weight of anhydrous sodium sulphate, 14 parts by weight of borax, 6.7 parts by weight of potassium chloride, 7.7 parts by weight of sodium acetate trihydrate and 31.6 parts by weight of pulverized graphite (containing 80% of particles not exceeding 5

μm.) is used in the bending of pipes by sprinkling it directly before the forming process onto the hot work piece. Bent pipes of high surface quality are achieved with an increase in the life of the tool of 50% as compared with a known high temperature lubricant in accordance with a lubricant known from German DAS 1,279,875.

Example 2

A mixture of 42 parts by weight of anhydrous sodium sulphate, 21 parts by weight of borax, 7 parts by weight of potassium chloride, 7 parts by weight of sodium acetate trihydrate, 21 parts by weight of pulverized graphite (having a particle size not exceeding 10 μm.) and 2 parts by weight of a sulfonated aliphatic polyester, e.g. Humifen WS 25® (manufactured by GAFC, New York, N.Y.), is mixed with 40 times the quantity of water. With the exception of the graphite, which remains in suspension, the substances are dissolved. This aqueous preparation is directly sprinkled into flat dies during intervals between the forging operation. By comparison with an oil-graphite mixture of the prior art, the life of the tool is increased by 35%. The inconvenience and health hazard to the operators is also eliminated.

Example 3

A mixture of 39 parts by weight of anhydrous sodium sulphate, 20 parts by weight of borax, 6.5 parts by weight of potassium chloride, 6.5 parts by weight of sodium acetate trihydrate, 18 parts by weight of graphite, 8 parts by weight of ammonium sulphate and 2 parts by weight of a sulphated alcohol, e.g. Humifen MNF® (manufactured by GAFC, New York, N.Y.), is mixed with 30 times the quantity of water. The temperature of the die is 150 to 250° C. The aqueous preparation is automatically sprinkled into the die between the forming operations. A prior art preparation consisting of a mixture of borax and an alkali phosphate in accordance with German Patent Specification No. 1,276,268 and additionally containing 18% of graphite gives only one-third of the life of the die as compared with that achieved by means of the preparation according to the invention.

Example 4

A mixture of 38 parts by weight of anhydrous sodium sulphate, 19 parts by weight of borax, 6.5 parts by weight of potassium chloride, 6.5 parts by weight of sodium acetate trihydrate, 17 parts by weight of graphite, 2 parts by weight of sodium ethyl naphthalin sulfonate, e.g. Humifen BA 75® (manufactured by GAFC, New York, N.Y.), 7.5 parts by weight of ammonium sulphate and 3.5 parts by weight of methyl cellulose, e.g. Natrosol® (manufactured by Hercules, Inc., Wilmington, Delaware), is mixed in 15 times the quantity of water. In the manufacture of crank shafts, an average increase in the life of the dies of 40% as compared with an oil-graphite mixture, is obtained. The output of crank shafts by 3 shifts is increased from 1300 to 2000.

Example 5

For use in deep dies for the manufacture of stub shafts, a mixture is prepared consisting of 35 parts by weight of anhydrous sodium sulphate, 14 parts by weight of borax, 3.5 parts by weight of potassium chloride, 3.5 parts by weight of sodium acetate trihydrate, 24 parts by weight of graphite, and 20 parts by weight of a mixture consisting of equal proportions by weight of magnesium hydroxide and a thiatriazol derivative, e.g. Porophor ACM® (manufactured by Farbenfabriken Bayer A.G., Leverkusen, Germany), with 10 times the quantity of water, and sprinkled into the upper and lower die. As compared with a preparation found in U.S. Patents Specification No. 2,518,585, the output of stub shafts is increased by 50%.

Example 6

For the manufacture of flanges for sliding tubes, a mixture is prepared consisting of 38 parts by weight of anhydrous sodium sulphate, 19.5 parts by weight of borax, 6.5 parts by weight of potassium chloride, 6.5 parts by weight of sodium acetate trihydrate, 18 parts by weight of graphite, 2 parts by weight of a sulfonated aliphatic polyester, e.g. Humifen WS 25® (manufactured by GAFC, New York, N.Y.), 8 parts by weight of ammonium sulphate and 1.5 parts by weight of an alginate stabilizer, e.g. Algipon® (manufactured by Henkel and Cie., Dusseldorf, Germany), in 10 times the quantity of water. In using the preparation according to the invention, the output of satisfactory work pieces is increased by 40% as compared with a preparation found in U.S. Patent Specification No. 3,423,317.

Example 7

A mixture consisting of 38 parts by weight of anhydrous sodium sulphate, 16 parts by weight of borax, 5 parts by weight of potassium chloride, 5 parts by weight of sodium acetate trihydrate, 10.5 parts by weight of graphite, 2 parts by weight of sodium ethyl naphthaline sulfonate, e.g. Humifen BA 75® (manufactured by GAFC, New York, N.Y.), 6.5 parts by weight of ammonium sulphate, 8.5 parts by weight of magnesium hydroxide and 8.5 parts by weight of azodicarbonamide is mixed with 10 times the quantity of water. By spraying the preparation into deep dies in the course of the forging operation in the manufacture of hollow bodies of rotation, an output is obtained which is 60% higher than that obtained in the same time using a preparation found in U.S. Patent Specification No. 2,258,309.

Example 8

A mixture consisting of 35 parts by weight of sodium sulphate, 17 parts by weight of borax, 6 parts by weight of potassium chloride, 6 parts by weight of sodium acetate trihydrate, 16 parts by weight of graphite, 2 parts by weight of a sulfonated alcohol, e.g. Humifen MNF® (manufactured by GAFC, New York, N.Y.), 7 parts by weight of ammonium sulphate, 1 part by weight of polysaccharide, e.g. Kelzan® (manufactured by Kelco Company, Los Angeles and Chicago, U.S.A.), 5 parts by weight of magnesium hydroxide, and 5 parts by weight of azoisobutyric acid dinitrile is mixed with 15 times the quantity of water and sprayed onto large work pieces into the dies at high die temperatures, in the course of a rapid forging operation. The working life of the die is increased by 40% as compared with the combination of oil and graphite with the addition of sawdust as used hitherto.

Example 9

For lubricating the mandrel during an extrusion operation, a mixture consisting of 41.5 parts by weight of anhydrous sodium sulphate, 24 parts by weight of borax, 3.5 parts by weight of KCl, 7.5 parts by weight of sodium acetate trihydrate, 17.5 parts by weight of graphite, 1 part by weight of polysaccharide, e.g. Kelzan® (manufactured by Kelco Company, Los Angeles and Chicago, U.S.A.), and 5.0 parts by weight of ammonium sulphate is injected into the previously perforated hot work piece with a trowel. The working life of the mandrel is increased by 70% as compared with the preparation in accordance with German DAS 1,204,767.

Example 10

A mixture consisting of 35 parts by weight of anhydrous sodium sulphate, 17 parts by weight of borax, 3.5 parts by weight of sodium acetate trihydrate, 10 parts by weight of graphite, 6 parts by weight of potassium chloride, 23.5 parts by weight of ammonium sulphate, 1.5 parts by weight of methyl cellulose, e.g. Natrosol® (manufactured by Hercules, Inc., Wilmington, Del.), and 17 parts by weight of azodicarbonamide is added to 20 times the quantity of water and applied to the hot work piece in a hot steel extrusion process which is at a temperature of approximately 150° C. by spraying. The working life of the tool is increased by 40% as compared with a preparation in accordance with German Patent Specification No. 1,050,486.

That which is claimed is:

1. A lubricant for high temperature non-chip metal forming consisting essentially of (I) 2 to 100% by weight of a mixture of (A) 35 to 47% by weight of an alkali metal sulphate, calculated in its anhydrous form, (B) 14 to 26% by weight of borax, (C) 3.5 to 10% by weight of potassium chloride, (D) 3.5 to 10% by weight of sodium acetate trihydrate, (E) 10 to 32% by weight of pulverized graphite having a particle size not exceeding 10 μm. and, (II) 0 to 98% by weight of water.

2. A lubricant as claimed in claim 1 wherein additives to reduce the commencement of the molten region of the lubricant are added which consist of 5 to 10% by weight of ammonium sulphate or magnesium hydroxide and a nitrogen containing organic compound selected from a group consisting of thiatriazol, azodicarbonamide, azoisobutyric acid dinitrile and mixtures thereof, in a proportion of 10 to 30% by weight of the overall weight of the lubricant.

References Cited

UNITED STATES PATENTS

| | | | |
|---|---|---|---|
| 3,341,454 | 9/1967 | Chor et al. | 252—18 |
| 2,258,309 | 10/1941 | Zimmer | 252—18 |

DANIEL E. WYMAN, Primary Examiner

I. VAUGHN, Assistant Examiner

U.S. Cl. X.R.

72—42; 252—25, 49.5